(12) United States Patent
Dawson et al.

(10) Patent No.: US 8,002,520 B2
(45) Date of Patent: Aug. 23, 2011

(54) CORE REFLEX NOZZLE FOR TURBOFAN ENGINE

(75) Inventors: Stacie M. Dawson, West Hartford, CT (US); Richard Wiley, East Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 694 days.

(21) Appl. No.: 12/159,517

(22) PCT Filed: Jan. 17, 2007

(86) PCT No.: PCT/US2007/001175
§ 371 (c)(1),
(2), (4) Date: Jun. 27, 2008

(87) PCT Pub. No.: WO2008/088328
PCT Pub. Date: Jul. 24, 2008

(65) Prior Publication Data
US 2010/0221102 A1    Sep. 2, 2010

(51) Int. Cl.
*F01D 25/00*    (2006.01)
*F04D 31/00*    (2006.01)
*F04D 29/00*    (2006.01)

(52) U.S. Cl. .................. 415/144; 415/116; 415/226

(58) Field of Classification Search ............... None
See application file for complete search history.

(56) References Cited

U.S. PATENT DOCUMENTS

| 2,763,984 | A | * | 9/1956 | Marchal et al. | ........... 239/265.17 |
| 3,618,699 | A | * | 11/1971 | Evans et al. | .................. 181/214 |
| 3,897,001 | A | * | 7/1975 | Helmintoller et al. | ....... 60/226.2 |
| 4,147,029 | A | * | 4/1979 | Sargisson | ........................ 60/262 |

(Continued)

FOREIGN PATENT DOCUMENTS

EP    1 860 313    11/2007

(Continued)

OTHER PUBLICATIONS

International Search Report for PCT Application No. PCT/US2007/001175, May 15, 2008.

(Continued)

*Primary Examiner* — Benjamin Sandvik
*Assistant Examiner* — Joseph Schoenholtz
(74) *Attorney, Agent, or Firm* — Carlson, Gaskey & Olds PC

(57) ABSTRACT

A turbofan engine is provided that includes a core nacelle at least partially surrounded by a fan nacelle. The core nacelle includes a reflex nozzle providing a core exit. The core nacelle includes a contour on its exterior surface upstream from the reflex nozzle. The contour is generally conical and tapers toward the core exit at a first slope. The reflex nozzle tapers toward the exit at a second slope that is less steep than the first slope. The reflex nozzle includes a generally linear portion. In one example, the reflex nozzle is provided by a generally cylindrical extension that sufficiently turns the bypass flow away from the core exit so that the core flow does not become choked.

8 Claims, 1 Drawing Sheet

U.S. PATENT DOCUMENTS

| | | | |
|---|---|---|---|
| 4,271,666 A * | 6/1981 | Hurley et al. | 60/226.1 |
| 6,129,311 A * | 10/2000 | Welch et al. | 244/117 R |
| 7,090,165 B2 * | 8/2006 | Jones et al. | 244/53 R |
| 7,165,744 B2 * | 1/2007 | Howarth et al. | 244/55 |
| 7,617,670 B2 * | 11/2009 | Truax et al. | 60/269 |
| 2002/0134070 A1 * | 9/2002 | Orlando et al. | 60/204 |
| 2008/0118348 A1 * | 5/2008 | Alecu | 415/144 |
| 2008/0175703 A1 * | 7/2008 | Lugg | 415/66 |
| 2009/0252600 A1 * | 10/2009 | Winter et al. | 415/145 |
| 2010/0221102 A1 * | 9/2010 | Dawson et al. | 415/144 |
| 2010/0254803 A1 * | 10/2010 | Papamoschou | 415/119 |

FOREIGN PATENT DOCUMENTS

| | | |
|---|---|---|
| WO | 00/77380 | 12/2000 |

OTHER PUBLICATIONS

International Preliminary Report on Patentability for PCT Application No. PCT/US2007/001175, Jul. 30, 2009.

* cited by examiner

CORE REFLEX NOZZLE FOR TURBOFAN ENGINE

BACKGROUND OF THE INVENTION

This application relates to a turbofan gas turbine engine. More particularly, the application relates to a reflex nozzle associated with a core nacelle of the engine.

Turbofan engines include a core nacelle at least partially surrounded by a fan nacelle. The core nacelle houses a compressor section and a turbine section that rotationally drives a turbofan. In high bypass turbofan arrangements, the turbofan creates most of the thrust provided by the turbofan engine.

Turbofan engines having a high bypass ratio with low fan pressure ratio engine cycles can have problems under descent idle conditions. Freestream and fan flow through the bypass flow path (between the core and fan nacelles) can choke the flow exiting the core nozzle under descent idle conditions. Further, the bypass flow can recirculate into the exit of the core nozzle. As a result, engine stability is adversely affected and a stall condition of the core can result.

The core nozzle includes an exterior surface that has a generally conical contour. To address the problem of descent idle conditions, some turbofan engines have used a small turnback at a terminal end of the conical nozzle. The turnback is provided by a relatively small exterior radius that is sloped to a lesser degree than the conical contour upstream from the turnback. The turnback has provided a negligible improvement and the core flow can still become choked during descent idle conditions.

What is needed is a turbofan engine that is not susceptible to the core flow becoming choked under descent idle conditions or other conditions in which the high bypass flow tends to suppress the flow through the core.

SUMMARY OF THE INVENTION

A turbofan engine is provided that includes a core nacelle at least partially surrounded by a fan nacelle. The core nacelle includes a reflex nozzle providing a core exit. The core nacelle includes a contour on its exterior surface upstream from the reflex nozzle. The contour is generally conical and tapers toward the core exit at a first slope. The reflex nozzle tapers toward the exit at a second slope that is less steep than the first slope. The reflex nozzle includes a generally linear portion. In one example, the reflex nozzle is provided by a generally cylindrical extension that sufficiently turns the bypass flow away from the core exit so that the core flow does not become choked.

These and other features of the present invention can be best understood from the following specification and drawings, the following of which is a brief description.

DETAILED DESCRIPTION OF THE PREFERRED EMBODIMENT

Figure 1:
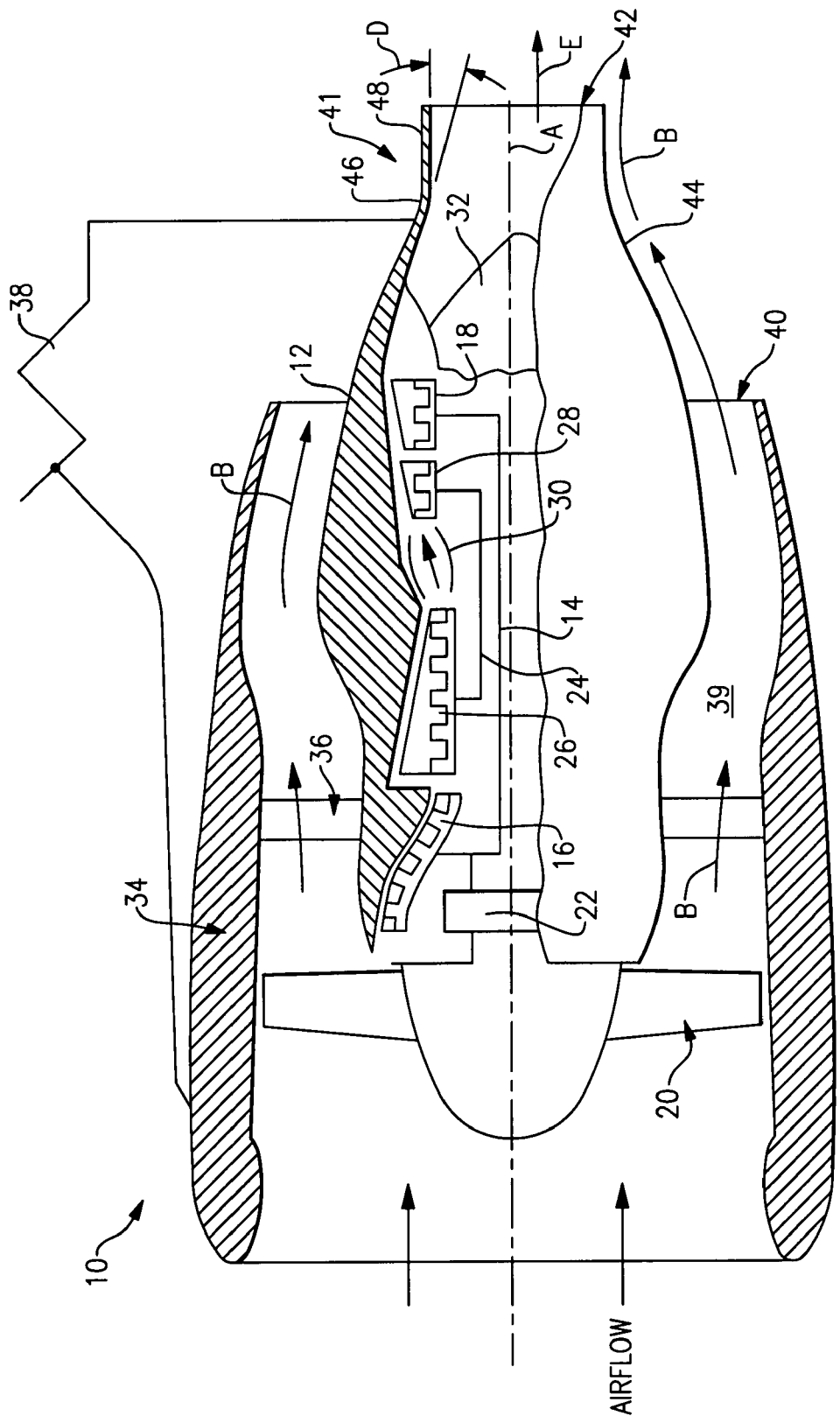
FIG. 1 is a cross-sectional view of an example turbofan engine including a core reflex nozzle.

A geared turbofan engine 10 is shown in FIG. 1. A pylon 38 mounts the engine 10 to an airplane. The engine 10 includes a core nacelle 12 that houses a low spool 14 and high spool 24 rotatable about an axis A. The low spool 14 supports a low pressure compressor 16 and low pressure turbine 18. In the example, the low spool 14 drives a turbofan 20 through a gear train 22. The high spool 24 supports a high pressure compressor 26 and high pressure turbine 28. A combustor 30 is arranged between the high pressure compressor 26 and high pressure turbine 28. Compressed air from compressors 16, 26 mixes with fuel from the combustor 30 and is expanded in turbines 18, 28.

In the examples shown, the engine 10 is a high bypass turbofan arrangement. In one example, the bypass ratio is greater than 10, and the turbofan diameter is substantially larger than the diameter of the low pressure compressor 16. The low pressure turbine 18 has a pressure ratio that is greater than 5, in one example. The gear train 22 is an epicycle gear train, for example, a star gear train, providing a gear reduction ratio of greater than 2.5. It should be understood, however, that the above parameters are only exemplary of a contemplated geared turbofan engine. That is, the invention is applicable to other engines.

Airflow enters a fan nacelle 34, which surrounds the core nacelle 12 and turbofan 20. The turbofan 20 directs air into the core nacelle 12, which is used to drive the turbines 18, 28, as is known in the art. Turbine exhaust E exits the core nacelle 12 once it has been expanded in the turbines 18, 28, in a passage provided between the core nacelle and a tail cone 32.

The core nacelle 12 is supported within the fan nacelle 34 by structure 36, which are commonly referred to as upper and lower bifurcations. A generally annular bypass flow path 39 is arranged between the core and fan nacelles 12, 34. The example illustrated in FIG. 1 depicts a high bypass flow arrangement in which approximately eighty percent of the airflow entering the fan nacelle 34 bypasses the core nacelle 12. The bypass flow B within the bypass flow path 39 exits the fan nacelle 34 through a bypass exit area 40. This bypass flow B has choked the turbine exhaust E in some prior art turbofan engines.

The core nacelle 12 includes a reflex nozzle 41 providing a core exit 42 through which the exhaust E leaves the core. If the exhaust flow E becomes choked or suppressed, the engine stability can become adversely affected and a stall condition can result.

The core nacelle 12 includes a contour 44 provided by a generally conical exterior surface upstream from the reflex nozzle 41. The bypass flow B flows along the contour 44 as it flows through and exits the bypass flow path 39. In one example, the contour 44 has a first slope that adjoins a radius or turnback 46. The reflex nozzle 41 includes an extension 48 that is generally cylindrical in shape in the example shown. The extension 48 includes a second slope that is less steep than the first slope provided by the contour 44. In one example, the extension 48 is cylindrical, and thus, the second slope is zero. The extension 48 includes a linear portion, which is provided by the cylindrical extension 48. In one example, the extension 48 extends axially approximately six inches. However, it should be understood that the length and geometry of the extension 48 is affected by the particular turbofan engine and its operating characteristics. The extension 48 turns the bypass flow B away from the core exit 42 providing suppression relief for the exhaust flow E leaving the core.

For high bypass turbofan engines, it is typically undesirable to provide any obstructions in the bypass flow path 39, which adversely impacts the efficiency of the engine 10 since most of the thrust is provided by the bypass flow B. To this end, it is generally undesirably for the extension 48 to extend radially outwardly toward the core exit 42. This is sometimes done when the core provides most of the thrust for the engine in order to suppress noise. However, this is not needed for a high bypass turbofan engine since the bypass flow provides most of the thrust.

The extension 48 may taper several degrees radially inward and toward the core exit 42. However, a cylindrical extension 48 is simpler and cheaper to manufacture.

Although an example embodiment has been disclosed, a worker of ordinary skill in this art would recognize that certain modifications would come within the scope of the claims. For that reason, the following claims should be studied to determine their true scope and content.

The invention claimed is:

1. A turbofan engine comprising:
   a core nacelle at least partially surrounded by a fan nacelle, the core and fan nacelles providing a bypass flow path;
   a turbofan rotationally driven by a turbine housed within the core nacelle, the turbofan arranged upstream from the core nacelle for providing a bypass flow through the bypass flow path; and
   a reflex nozzle provided by the core nacelle and including a core exit, the core nacelle including an exterior surface having a contour tapering toward the core exit at a first slope, the reflex nozzle arranged downstream from the contour and tapering toward the core exit at a second slope less steep than the first slope, the reflex nozzle including a linear portion.

2. The engine according to claim 1, wherein the reflex nozzle provides a generally cylindrical extension.

3. The engine according to claim 2, wherein the generally cylindrical extension extends axially approximately six inches.

4. The engine according to claim 1, wherein the second slope tapers radially inward toward the core exit up to several degrees.

5. The engine according to claim 1, comprising a gear train interconnected between the turbine and the turbofan.

6. The engine according to claim 1, comprising a radius adjoining the reflex nozzle and the contour.

7. A turbofan engine comprising:
   a core nacelle at least partially surrounded by a fan nacelle; and
   a reflex nozzle provided by the core nacelle and including a core exit, the core nacelle including an exterior surface having a generally conical contour tapering toward the core exit, the reflex nozzle including a generally cylindrical extension downstream from the generally conical contour.

8. The engine according to claim 7, wherein the generally cylindrical extension extends axially approximately six inches.

* * * * *